(12) United States Patent
Kato et al.

(10) Patent No.: US 10,056,836 B2
(45) Date of Patent: Aug. 21, 2018

(54) DC POWER SOURCE APPARATUS

(71) Applicant: Mitsubishi Electric Corporation, Tokyo (JP)

(72) Inventors: Shingo Kato, Tokyo (JP); Matahiko Ikeda, Tokyo (JP); Nobuhiro Kihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/433,037

(22) Filed: Feb. 15, 2017

(65) Prior Publication Data

US 2017/0373597 A1 Dec. 28, 2017

(30) Foreign Application Priority Data

Jun. 27, 2016 (JP) ................................. 2016-126286

(51) Int. Cl.
*H02M 3/158* (2006.01)
*H02M 1/08* (2006.01)
*H02M 1/32* (2007.01)
*H02M 1/00* (2006.01)

(52) U.S. Cl.
CPC ............. *H02M 3/158* (2013.01); *H02M 1/08* (2013.01); *H02M 1/32* (2013.01); *H02M 2001/0009* (2013.01)

(58) Field of Classification Search
CPC .......... H02M 3/158; H02M 1/08; H02M 1/32; H02M 2001/0009
See application file for complete search history.

(56) References Cited

U.S. PATENT DOCUMENTS

| | | | | |
|---|---|---|---|---|
| 8,581,533 | B2* | 11/2013 | Hayashi | H02P 29/02 310/315 |
| 2011/0127936 | A1* | 6/2011 | Ogasawara | H02M 3/158 318/400.3 |
| 2013/0119961 | A1 | 5/2013 | Okuda et al. | |
| 2013/0147459 | A1* | 6/2013 | Kim | B60L 3/0038 323/351 |

(Continued)

FOREIGN PATENT DOCUMENTS

| | | |
|---|---|---|
| JP | 2004-304871 A | 10/2004 |
| JP | 2006-74973 A | 3/2006 |

(Continued)

OTHER PUBLICATIONS

Communication dated Jul. 25, 2017, issued by the Japanese Patent Office in counterpart Japanese Application No. 2016-126286.

*Primary Examiner* — Fred E Finch, III
*Assistant Examiner* — Demetries A Gibson
(74) *Attorney, Agent, or Firm* — Sughrue Mion, PLLC; Richard C. Turner

(57) ABSTRACT

There is provided a DC power source apparatus that can prevent failures in components included in the DC power source apparatus and a load and that can prevent damage to or deterioration in the components. A control unit of the DC power source apparatus includes a function of limiting a duty value that is the ratio of an on-time to the switching period of a switching device, and makes an upper limit value for limiting the upper limit of the duty value variable during switching operation of the switching device.

9 Claims, 9 Drawing Sheets

(56) References Cited

U.S. PATENT DOCUMENTS

| | | | | |
|---|---|---|---|---|
| 2014/0321182 | A1* | 10/2014 | Takamatsu | B60L 7/14 |
| | | | | 363/132 |
| 2015/0069990 | A1* | 3/2015 | Feldtkeller | H02M 3/158 |
| | | | | 323/284 |
| 2015/0288281 | A1 | 10/2015 | Takamatsu et al. | |
| 2015/0326124 | A1* | 11/2015 | Ono | H02M 3/158 |
| | | | | 323/271 |
| 2016/0065073 | A1* | 3/2016 | Katsuki | H02M 3/158 |
| | | | | 323/271 |
| 2016/0241133 | A1* | 8/2016 | Yamakawa | H02M 3/158 |
| 2016/0280076 | A1* | 9/2016 | Yaegaki | H02M 3/155 |
| 2017/0331376 | A1* | 11/2017 | Granato | H02M 3/158 |
| 2017/0331398 | A1* | 11/2017 | Sugawara | H02P 6/085 |

FOREIGN PATENT DOCUMENTS

| | | |
|---|---|---|
| JP | 2010-273490 A | 12/2010 |
| JP | 5457559 B2 | 1/2014 |
| JP | 2014-82814 A | 5/2014 |

* cited by examiner

DC POWER SOURCE APPARATUS

BACKGROUND OF THE INVENTION

Field of the Invention

The present invention relates to a DC power source apparatus that boosts the voltage of a power source and then supplies the boosted voltage to a load.

Description of the Related Art

As disclosed in Patent Document 1, a DC power source apparatus that is provided between a power source and a load and boosts the voltage of the power source and then supplies the boosted voltage to the load is utilized as a DC power source apparatus that supplies electric power to the load. The DC power source apparatus disclosed in Patent Document 1 generates a DC voltage by making a switching means short-circuit or open an AC voltage from an AC power source, through a reactor, and then supplies the DC voltage to a load; the DC power source apparatus includes a current control unit that performs PWM control of the switching means in such a way the waveform of an input current from the AC power source becomes an approximately sinusoidal target current waveform and a voltage control unit that performs control in such a way that the generated DC voltage becomes a predetermined target voltage; the DC power source apparatus is configured in such a way that by setting a limited value for the duty value in the PWM control for each voltage phase of the AC power source, an excessive current is prevented from flowing in the switching means when an abnormality occurs in the AC power source.

PRIOR ART REFERENCE

Patent Document

[Patent Document 1] Japanese Patent Application Laid-Open No. 2010-273490

In the conventional DC power source apparatus disclosed in foregoing Patent Document 1, the duty upper limit value of the switching means is set based on the target value of the DC voltage; therefore, in the case where, for example, a short-to-ground failure occurs in a voltage sensor and hence it is erroneously determined that a high-voltage-side voltage detection value for controlling the high-voltage-side voltage through voltage feedback is extremely low in comparison with an actual high-voltage-side voltage or 0 [V], the high-voltage-side voltage may rise up to a value higher than the high-voltage-side voltage target value. As a result, there may occur a failure such as giving damage to or deteriorating components included in the DC power source apparatus and giving damage to a load.

The present invention has been implemented in order to solve the foregoing problems in conventional DC power source apparatuses; the objective thereof is to provide a DC power source apparatus that can prevent failures in, damage to, or deterioration in components included in the DC power source apparatus and a load even when a short-to-ground failure occurs in the voltage sensor.

SUMMARY OF THE INVENTION

A DC power source apparatus according to the present invention is connected between a power source and a load and boosts the voltage of the power source and then supplies the boosted voltage to the load; the DC power source apparatus includes a reactor connected between an interconnection portion of a plurality of switching devices and the power source, a low-voltage-side smoothing capacitor that smoothes a low-voltage-side voltage to be applied to the reactor, a high-voltage-side smoothing capacitor that smoothes a high-voltage-side voltage to be supplied to the load, a low-voltage-side voltage sensor that detects the low-voltage-side voltage, a high-voltage-side voltage sensor that detects the high-voltage-side voltage, and a control unit that performs PWM-control of the plurality of switching devices in such a way that a high-voltage-side voltage detection value detected by the high-voltage-side voltage sensor keeps track of a high-voltage-side voltage target value; the DC power source apparatus according to the present invention is characterized in that the control unit includes a function of limiting a duty value that is the ratio of an on-time to a switching period of the switching device, and makes an upper limit value for limiting the upper limit of the duty value variable during switching operation of the switching device.

The DC power source apparatus according to the present invention includes a low-voltage-side smoothing capacitor that smoothes a low-voltage-side voltage to be applied to the reactor, a high-voltage-side smoothing capacitor that smoothes a high-voltage-side voltage to be supplied to the load, a low-voltage-side voltage sensor that detects the low-voltage-side voltage, a high-voltage-side voltage sensor that detects the high-voltage-side voltage, and a control unit that performs PWM-control of the plurality of switching devices in such a way that a high-voltage-side voltage detection value detected by the high-voltage-side voltage sensor keeps track of a high-voltage-side voltage target value; the control unit includes a function of limiting a duty value that is the ratio of an on-time to a switching period of the switching device, and makes an upper limit value for limiting the upper limit of the duty value variable during switching operation of the switching device; therefore, when a short-to-ground failure occurs in the high-voltage-side voltage sensor, the duty value can be prevented from drastically rising and hence the high-voltage-side voltage is prevented from rising; thus, failures in, damage to, or deterioration in components included in the DC power source apparatus and a load can be prevented.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
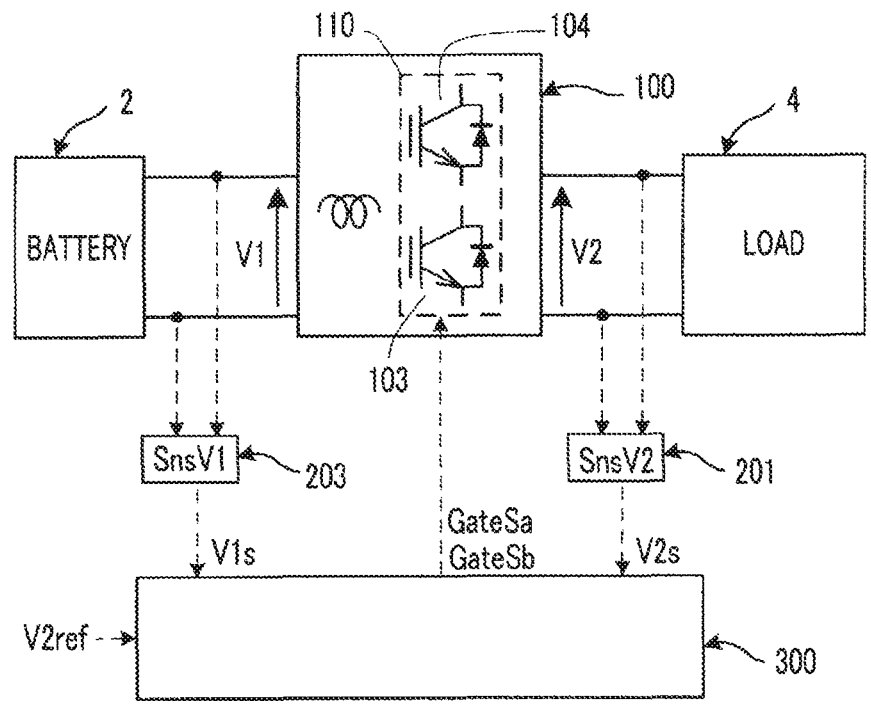
FIG. 1 is a configuration diagram representing the configuration of a DC power source apparatus according to Embodiment 1 of the present invention.
Figure 2:
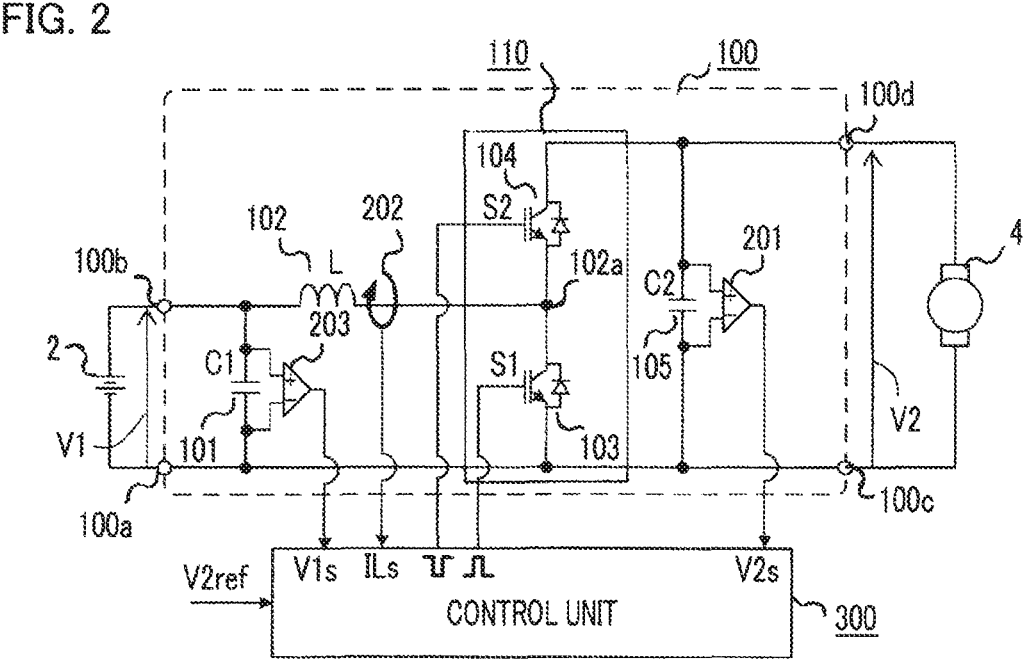
FIG. 2 is a circuit diagram representing the circuit configuration of the DC power source apparatus according to Embodiment 1 of the present invention.

Hereinafter, a DC power source apparatus according to Embodiment 1 of the present invention will be explained. FIG. 1 is a configuration diagram representing the configuration of a DC power source apparatus according to Embodiment 1 of the present invention; FIG. 2 is a circuit diagram representing the circuit configuration of the DC power source apparatus according to Embodiment 1 of the present invention. The DC power source apparatus according to Embodiment 1 of the present invention is configured as a DC/DC converter; thus, in the following description, the DC power source apparatus according to Embodiment 1 will be explained as a DC/DC converter. In each of FIGS. 1 and 2, a DC/DC converter 100, which is a bidirectional electric power converter that can bidirectionally perform electric-power conversion between a power source 2 such as a battery and a load 4 such as a DC motor, is provided with an electric-power conversion unit 110 including a pair of switching devices consisting of a first switching device 103 (also referred to as S1) and a second switching device 104 (also referred to as S2) that are connected in series with each other at a first connection portion 102a. As described later, the DC/DC converter 100 boosts a voltage V1 inputted from the power source 2 up to a voltage V2 that is the same as or higher than the voltage V1, and then outputs the V2.

The voltage V1 inputted to the DC/DC converter 100 is boosted to the voltage V2 that is the same as or higher than the voltage V1 and is outputted from the DC/DC converter 100; therefore, in the following explanation, the voltage V1 and the voltage V2 will be referred to as a low-voltage-side voltage V1 and a high-voltage-side voltage V2, respectively.

The power source 2, the negative-polarity electrode of which is connected with a first terminal 100a (also referred to as Vcom) of the DC/DC converter 100 and the positive-polarity electrode of which is connected with a second terminal 100b (also referred to as VL) thereof, inputs the low-voltage-side voltage V1 to the DC/DC converter 100. The load 4 is connected between a third terminal 100c and a fourth terminal 100d of the DC/DC converter 100; the high-voltage-side voltage V2, which is outputted from the DC/DC converter 100, is applied to the load 4.

A reactor 102, provided for accumulating energy, is connected between the first connection portion 102a of the electric-power conversion unit 110 and the second terminal 100b. A low-voltage-side smoothing capacitor 101, connected between the first terminal 100a and the second terminal 100b, smoothes the low-voltage-side voltage V1. A high-voltage-side smoothing capacitor 105, connected between the third terminal 100c and the fourth terminal 100d, smoothes the high-voltage-side voltage V2, which is the output of the electric-power conversion unit 110.

A low-voltage-side voltage sensor 203 (also referred to as SnsV1), connected between the first terminal 100a and the second terminal 100b, constantly detects the voltage between the first terminal 100a and the second terminal 100b, i.e., the low-voltage-side voltage V1, and inputs a low-voltage-side voltage detection value V1s to a control unit 300. A high-voltage-side voltage sensor 201 (also referred to as SnsV2), connected between the third terminal 100c and the fourth terminal 100d, constantly detects the voltage between the third terminal 100c and the fourth terminal 100d, i.e., the high-voltage-side voltage V2 obtained through voltage boosting by the electric-power conversion unit 110, and inputs a high-voltage-side voltage detection value V2s to the control unit 300. A current sensor 202 constantly detects a reactor current IL that flows in the reactor 102, and inputs a current detection value ILs to the control unit 300.

The first terminal 100a and the third terminal 100c are connected in common with each other. Each one of the first terminal 100a and the third terminal 100c may serve as the other one thereof.

As described later, based on a high-voltage-side voltage target value V2ref to be inputted from the outside, the low-voltage-side voltage detection value V1s, the high-voltage-side voltage detection value V2s, and the current detection value ILs, the control unit 300 generates a first gate signal GateSa and a second gate signal GateSb, and provides the first gate signal GateSa and the second gate signal GateSb to the gates of the first switching device 103 and the second switching device 104, respectively. The control unit 300 has a function of performing voltage feedback control based on information on the low-voltage-side voltage detection value V1s and the high-voltage-side voltage detection value V2s.

The first switching device 103 is driven, as described later, based on the first gate signal GateSa provided to the gate thereof; the second switching device 104 is driven, as described later, based on the second gate signal. GateSb provided to the gate thereof.

As described above, the DC/DC converter 100, as a DC power source apparatus, is a bidirectional DC/DC converter that can perform bidirectional electric-power conversion between the low voltage side and the high voltage side; the DC/DC converter 100 boosts the DC low-voltage-side voltage V1 inputted between the first terminal 100a and the second terminal 100b, which are the low-voltage-side terminals, up to a voltage that is the same as or higher than the low-voltage-side voltage V1, and then outputs the boosted high-voltage-side voltage V2 between the third terminal 100c (also referred to as Vcom) and the fourth terminal 100d (also referred to as VH), which are the high-voltage-side terminals. As the operation states of the DC/DC converter 100 according to Embodiment 1, there exist two states, i.e., a power-running operation state in which electric power is supplied from a battery as the power source 2 to a motor as the load 4 so that the motor is driven and a regenerative operation state in which electric power generated by the motor in a power generation state is supplied to the battery.

Each of the first switching device 103 and the second switching device 104 is configured, for example, with an IGBT (Insulated Gate Bipolar Transistor) and an antiparallel diode that are combined with each other. In Embodiment 1, the first switching device 103 is turned on and turned off when the first gate signal GateSa from the control unit 300 is high-level and low-level, respectively; the second switching device 104 is turned on and turned off when the second gate signal GateSb from the control unit 300 is high-level and low-level, respectively.

The collector terminal of the first switching device 103 is connected with the first connection portion 102a; the emitter terminal thereof is connected with the first terminal 100a and the third terminal 100c. The emitter terminal of the second switching device 104 is connected with the first connection portion 102a; the collector terminal thereof is connected with the fourth terminal 100d. The first connection portion 102a with which the collector terminal of the first switching device 103 and the emitter terminal of the second switching device 104 are connected is connected with the second terminal 100b by way of the reactor 102.

Figure 3:
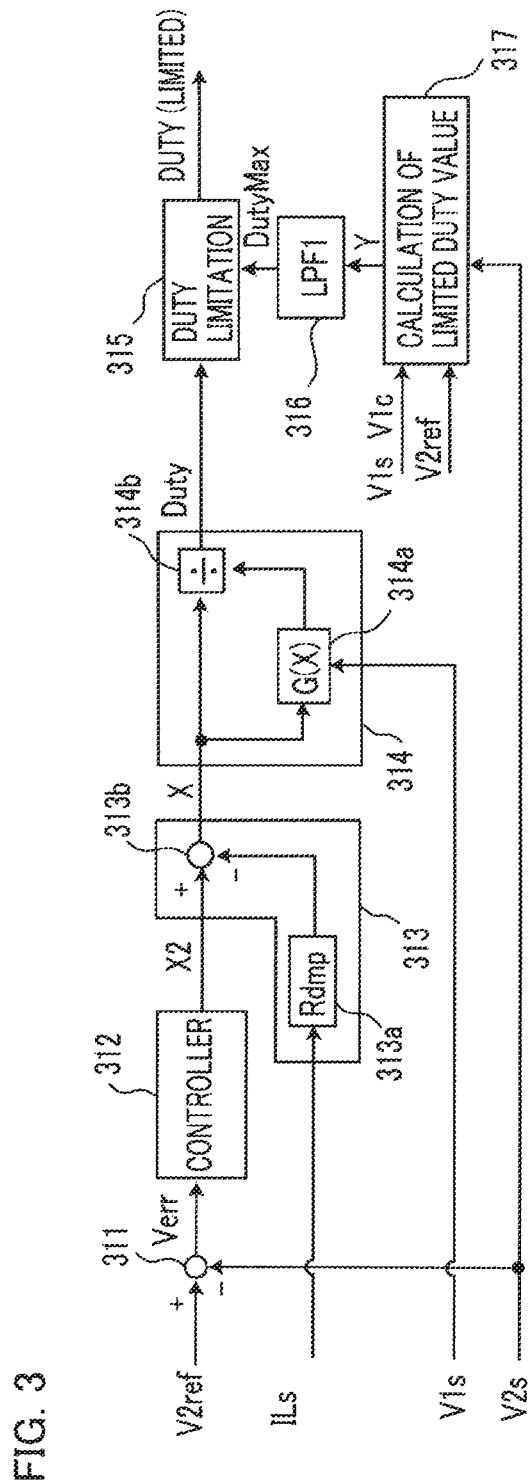
FIG. 3 is a functional block diagram representing the function of voltage feedback control in the DC power source apparatus according to Embodiment 1 of the present invention.
Figure 4:
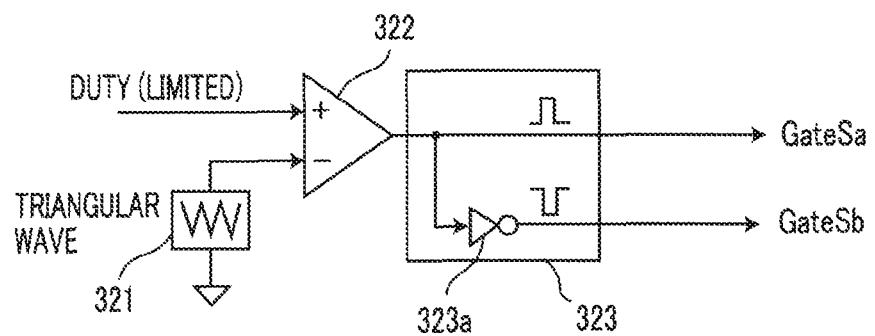
FIG. 4 is a functional block diagram representing the function of generating a PWM waveform in the DC power source apparatus according to Embodiment 1 of the present invention.

FIG. 3 is a functional block diagram representing the function of voltage feedback control in the DC power source apparatus according to Embodiment 1 of the present invention; FIG. 4 is a functional block diagram representing the function of generating a PWM waveform in the DC/DC converter according to Embodiment 1 of the present invention; each of FIGS. 3 and 4 represents the functional configuration of the control unit 300 illustrated in each of FIGS. 1 and 2. As represented in FIG. 3, the control unit 300 includes, as the functional configuration thereof, a subtractor 311, a controller 312, a resonance suppression block 313, a gain normalization block 314, a triangular-wave generation unit 321, a comparator 322, and a gate signal output unit 323. The resonance suppression block 313 includes a multiplier 313a and a subtractor 313b, which operate as described later. The gain normalization block 314 includes a computing unit 314a and a divider 314b, which operate as described later. All or part of the foregoing constituent elements in the control unit 300 can be configured by a microcomputer software program.

The high-voltage-side voltage target value V2ref to be set at the outside and the high-voltage-side voltage detection value V2s detected by the high-voltage-side voltage sensor 201 are inputted to the subtractor 311 in the control unit 300.

The subtractor 311 performs subtraction between the inputted high-voltage-side voltage target value V2ref and the high-voltage-side voltage detection value V2s, generates a differential voltage Verr, which is the difference between the high-voltage-side voltage target value V2ref and the high-voltage-side voltage detection value V2s, and then inputs the differential voltage Verr to the controller 312. In Embodiment 1, the controller 312 amplifies the differential voltage Verr by use of PI control so as to generate a controller output X2 and then inputs the controller output X2 to the subtractor 313b in the resonance suppression block 313. Instead of the foregoing PI control, for example, P control, PD control, PID control, or the like may be utilized.

The current detection value ILs detected by the current sensor 202 is inputted to the multiplier 313a in the resonance suppression block 313; the reactor current IL based on the inputted current detection value ILs is multiplied by a constant Rdmp; then, the multiplication product value is inputted to the subtractor 313b in the resonance suppression block 313. The subtractor 313b in the resonance suppression block 313 performs calculation processing expressed by the equation (1) below, based on the inputted controller output X2 and the value from the multiplier 313a, and outputs the result of the calculation processing, as a resonance suppression block output X.

$$X = X2 - IL_s \times Rdmp \quad (1)$$

The computing unit 314a in the gain normalization block 314 receives the resonance suppression block output X calculated by the resonance suppression block 313 and the low-voltage-side voltage detection value V1s detected by the low-voltage-side voltage sensor 203, performs calculation processing expressed by the equation (2) below, and then inputs the result of the calculation processing to the divider 314b in the gain normalization block 314.

$$G(X) = X + V1s \quad (2)$$

The divider 314b in the gain normalization block 314 divides the inputted resonance suppression block output X by the value obtained through calculation, according to the equation (2), that is performed by the computing unit 314a, and then outputs the division value. The output of the divider 314b is a duty value Duty.

The duty value Duty outputted from the divider 314b is inputted to a duty limiting block 315; a duty upper limit value DutyMax from a lowpass filter block 316 is imposed on the duty value Duty; then, the limited duty value Duty is outputted. As the duty upper limit value DutyMax, a value calculated by the lowpass filter block 316 and a limited duty value calculation block 317 is utilized.

In other words, the limited duty value calculation block 317 outputs a calculation result Y calculated based on information items on the high-voltage-side voltage detection value V2s detected by the high-voltage-side voltage sensor 201, the high-voltage-side voltage target value V2ref, the low-voltage-side voltage detection value V1s detected by the low-voltage-side voltage sensor 203, and a low-voltage-side voltage fixation value V1c. The calculation result Y is inputted to the lowpass filter block 316. The lowpass filter block 316 outputs the duty upper limit value DutyMax, which is the result of the lowpass filter calculation, to the duty limiting block 315. The method of limiting the duty and the specific contents of the effect thereof will be described later.

In the functional block diagram, in FIG. 4, representing the function of generating a PWM waveform, the comparator 322, which generates a pulse waveform, receives the limited duty value Duty outputted from the duty limiting block 315 and a triangular waveform, having a specific period, that is generated by the triangular-wave generation unit 321, compares these inputted values, and then generates a pulse waveform. The triangular-wave generation unit 321 may be replaced by a sawtooth waveform generation unit that generates not a triangular waveform but a sawtooth waveform.

A pulse waveform outputted from the comparator 322 is directly outputted as the first gate signal GateSa and is also outputted, as the second gate signal GateSb, by way of an inverter 323*a*. The high level and the low level of the second gate signal GateSb are complementary to the low level and the high level, respectively, of the first gate signal GateSa.

By making the control unit 300 perform feedback control of the high-voltage-side voltage in such a manner as described above, deviations from the ideal state, such as the loss caused by the resistance component of the circuit and an error in the actual on-time, caused by a signal delay of the gate signal, are corrected so that the duty value is changed. As a result, in the steady state, by utilizing PI control or PID control in the controller 312, the high-voltage-side voltage V2 can be made to keep track of the high-voltage-side voltage target value V2*ref*.

Next, there will be explained the changing amounts of the high-voltage-side voltage V2 and the reactor current IL at a time when in the DC/DC converter as the DC power source apparatus according to Embodiment 1 of the present invention, the electric-power conversion unit 110 adjusts the duty value for PWM control. In the ideal state where a value calculated by the control unit 300 is directly reflected in the respective on-times of the first switching device 103 and the second switching device 104, the On rate of the first switching device 103 is the duty value Duty, and the On rate of the second switching device 104 is [1−Duty]. Letting I2, C2, and L denote the load current that flows in the load 4, which is a motor, the electrostatic capacitance of the high-voltage-side smoothing capacitor 105, and the inductance value L of the reactor 102 for accumulating energy, the state averaging equation for the DC/DC converter 100 can be given as the equation (3) below.

$$\frac{d}{dt}\begin{bmatrix} V2 \\ IL \end{bmatrix} = \begin{bmatrix} 0 & \frac{1-\text{Duty}}{C2} \\ -\frac{1-\text{Duty}}{L} & 0 \end{bmatrix}\begin{bmatrix} V2 \\ IL \end{bmatrix} + \begin{bmatrix} -\frac{I2}{C2} \\ \frac{V1}{L} \end{bmatrix} \quad (3)$$

In the steady state, by substituting "0" for the left-hand side of the equation (3), the equations (4) and (5) below are obtained.

$$\frac{I2}{IL} = 1 - \text{Duty} \quad (4)$$

$$\frac{V2}{V1} = \frac{1}{1 - \text{Duty}} \quad (5)$$

Figure 5:
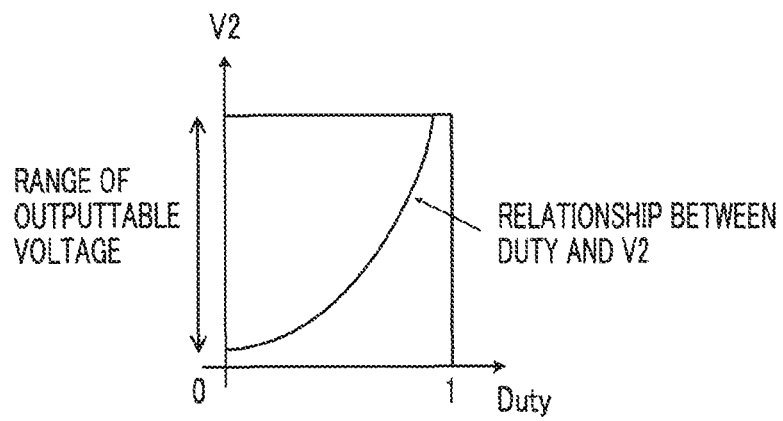
FIG. 5 is an explanatory diagram representing the relationship between the duty value and the high-voltage-side voltage in the DC power source apparatus according to Embodiment 1 of the present invention.

FIG. 5 is an explanatory diagram representing the relationship between the duty value and the high-voltage-side voltage in the DC power source apparatus according to Embodiment 1 of the present invention; FIG. 5 represents the equation (5) in a graphical manner. As represented in FIG. 5, it ca be seen that high-voltage-side voltage V2 can be raised by making the duty value Duty rise and that the possible range of the high-voltage-side voltage V2 can be specified by the duty value Duty.

Next, by modifying the equation (5), there can be obtained the equation (6) below for determining a duty value DutyV1 and a duty value DutyV2 in accordance with the low-voltage-side voltage V1 and the high-voltage-side voltage V2.

$$\text{Duty}(V1, V2) = 1 - \frac{V1}{V2} \quad (6)$$

In this situation, by use of the equation (6), there can be obtained a maximum duty value Max(V1*min*, V2*max*), through the equation (7) below, that can be take the duty value based on a low-voltage-side voltage minimum value V1*min* and a high-voltage-side voltage maximum value V2*max*, which is the minimum value of the low-voltage-side voltage V1 and the maximum value of the high-voltage-side voltage V2, respectively, in the normal operation voltage range.

$$\text{DutyMax}(V1\text{min}, V2\text{max}) = 1 - \frac{V1\text{min}}{V2\text{max}} \quad (7)$$

Figure 6:
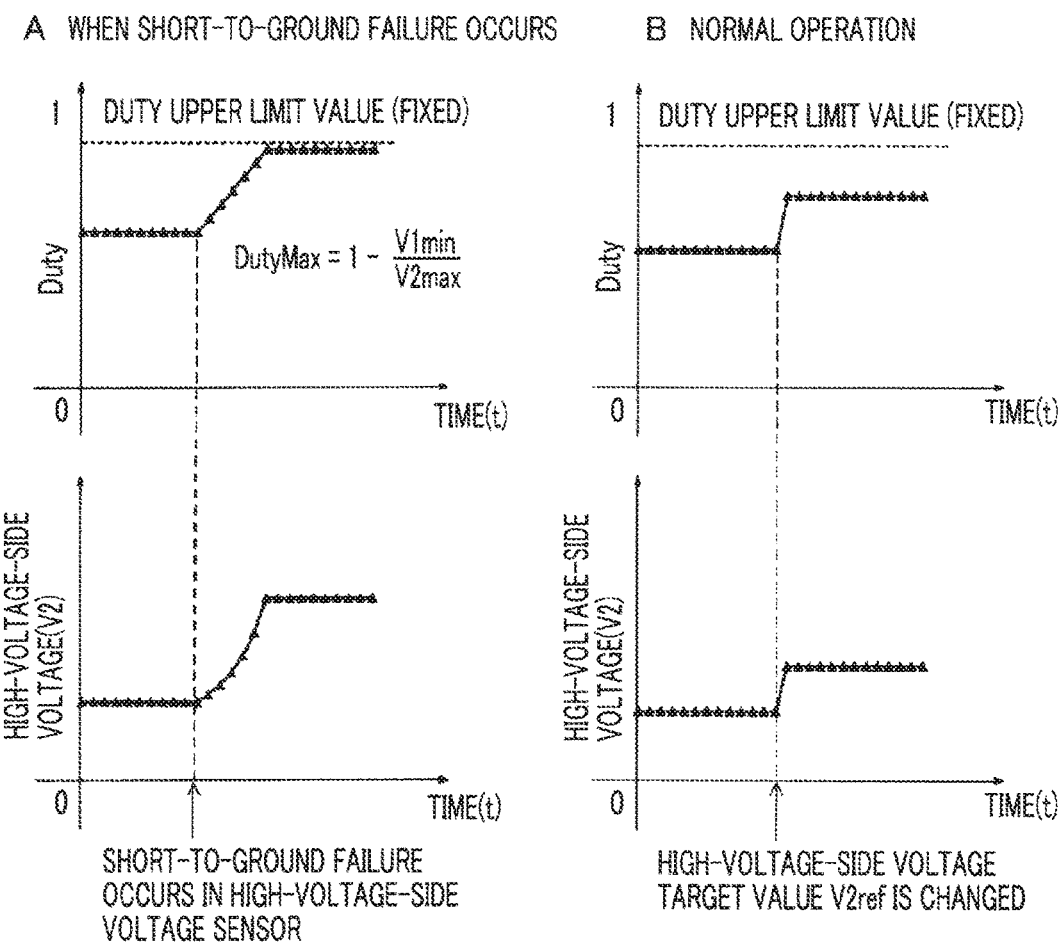
FIG. 6 is a set of explanatory charts representing the behavior of the duty value and a high-voltage-side voltage V2 at a time when a short-to-ground failure occurs in a high-voltage-side voltage sensor in the case where in the DC power source apparatus according to Embodiment 1 of the present invention, the duty upper limit value is fixed and the behavior of the duty value and the high-voltage-side voltage V2 at a time when at a time of normal operation, the high-voltage-side voltage target value is changed in the case where the duty-value upper limit value is fixed.

In the conventional technology, the duty is limited by utilizing the equation (7), as the duty upper limit value. FIG. 6 represents the behavior of the high-voltage-side voltage V2 at a time when this method is adopted and a short-to-ground failure occurs in the high-voltage-side voltage sensor 201. In other words, FIG. 6 is a set of explanatory charts representing the behavior of the duty value and the high-voltage-side voltage at a time when a short-to-ground failure occurs in a high-voltage-side voltage sensor in the case where in the DC power source apparatus according to Embodiment 1 of the present invention, the duty upper limit value is fixed and the behavior of the duty value and the high-voltage-side voltage at a time when at a time of normal operation, the high-voltage-side voltage target value is changed in the case where the duty-value upper limit value is fixed; Charts A and B represent the case where a short-to-ground failure occurs and the case where normal operation is performed, respectively. As represented by Chart A in FIG. 6, a constant duty value and a constant high-voltage-side voltage V2 are maintained before a short-to-ground failure occurs in the high-voltage-side voltage sensor 201; however, because when a short-to-ground failure occurs in the high-voltage-side voltage sensor 201, the high-voltage-side voltage detection value V2*s* in FIG. 3 falls to a small value or "0", the differential voltage Verr outputted by the subtractor 311 rises; as a result, control is performed so that the duty value rises. Accordingly, the high-voltage-side voltage V2 also rises; therefore, in some cases, an excessive voltage may be imposed on a component in the DC/DC converter 100 or a motor as the load 4 connected with the high voltage side, thereby causing component breakage or component deterioration. Chart B in FIG. 6 suggests that in the case where the value of the high-voltage-side voltage target value V2*ref* is changed, the high-voltage-side voltage V2 is operable in the range where the duty is under the duty upper limit value.

In contrast to the foregoing conventional technology, in the DC power source apparatus according to Embodiment 1 of the present invention, by use of the high-voltage-side voltage detection value V2*s*, the low-voltage-side voltage detection value V1s, and a duty offset $\alpha_1$, the duty upper limit value DutyMax(V1s, V2s) is calculated through the equation (8) below.

$$DutyMax(V1s, V2s) = 1 - \frac{V1s}{V2s} + \alpha_1 \quad (8)$$

Figure 7:
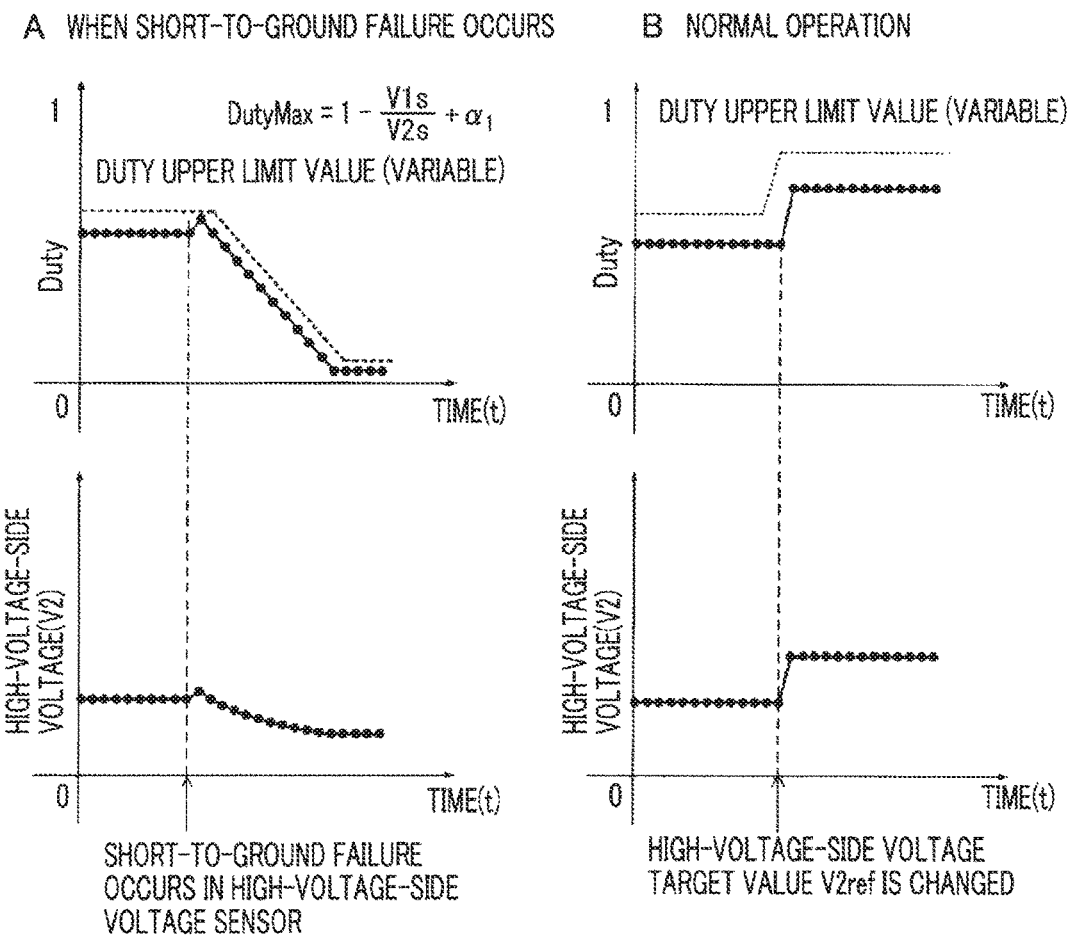
FIG. 7 is a set of explanatory charts representing the behavior of the duty value and a high-voltage-side voltage V2 at a time when a short-to-ground failure occurs in a high-voltage-side voltage sensor in the case where in the DC power source apparatus according to Embodiment 1 of the present invention, the duty upper limit value is variable and the behavior of the duty value and the high-voltage-side voltage V2 at a time when at a time of normal operation, the high-voltage-side voltage target value is changed in the case where the duty upper limit value is variable.

FIG. 7 is a set of explanatory charts representing the behavior of the duty value and a high-voltage-side voltage V2 at a time when a short-to-ground failure occurs in a high-voltage-side voltage sensor in the case where in the DC power source apparatus according to Embodiment 1 of the present invention, the duty upper limit value is variable and the behavior of the duty value and the high-voltage-side voltage V2 at a time when at a time of normal operation, the high-voltage-side voltage target value V2ref is changed in the case where the duty upper limit value is variable; FIG. 7 represents the behavior of the high-voltage-side voltage V2 at a time when in the case where the duty is limited by utilizing, as the duty upper limit value, the calculation value obtained through the equation (8), a short-to-ground failure occurs in the high-voltage-side voltage sensor 201. Chart A and Chart B in FIG. 7 represent the case where a short-to-ground failure occurs and the case where normal operation is performed, respectively. As represented by Chart A in FIG. 7, a constant duty value and a constant high-voltage-side voltage V2 are maintained before a short-to-ground failure occurs in the high-voltage-side voltage sensor 201; however, because when a short-to-ground failure occurs in the high-voltage-side voltage sensor 201, the high-voltage-side voltage detection value V2s in FIG. 3 falls to a small value or "0", the differential voltage Verr rises, thereby trying to raise the duty value; however, because the duty upper limit value DutyMax (V1s, V2s) based on the equation (8) falls, the duty value is eventually decreased and hence the high-voltage-side voltage V2 can also be decreased. The comparison between the respective behaviors of the high-voltage-side voltage V2 in FIGS. 6 and 7 suggests that the duty limiting represented in FIG. 7 can more suppress the rise of the high-voltage-side voltage V2. Chart B in FIG. 7 suggests that because when in the normal operation, the high-voltage-side voltage V2 is changed, the duty upper limit value changes, the high-voltage-side voltage V2 is operable. When before the high-voltage-side voltage V2 is changed, the duty upper limit value becomes the same as the actual duty value, the high-voltage-side voltage cannot be raised from the present value. In order to avoid this problem, it is required to secure the operable range of the duty value; therefore, as represented in the right-hand side of the equation (8), the duty upper limit value is calculated through the equation in which the offset $\alpha_1$ is added.

In this situation, because the equation (8) gives a duty upper limit value, which is derived from a theoretical equation based on the ideal state, it is required to consider the effects of the variations in the components and an error in the actual DC/DC converter. These effects may cause such a defect as that in the case where the duty upper limit value derived through the equation (8) is utilized, the possible duty value in the normal operation range is limited and hence the high-voltage-side voltage V2 cannot keep track of the high-voltage-side voltage target value V2ref. The contributing factors thereof may include the effects of the respective detection error rates of the low-voltage-side voltage sensor 203 and the high-voltage-side voltage sensor 201, the effect of a dead time where the first switching device 103 and the second switching device 104, which are the lower arm and the upper arm, respectively, of the electric-power conversion unit 110, are turned off at the same time, and the effect of a voltage drop due to the resistance components of the circuit and the constituent parts thereof. Chart B in FIG. 7 suggests that because when the high-voltage-side voltage V2 is changed, the duty upper limit value changes, the high-voltage-side voltage V2 is operable. When before the high-voltage-side voltage V2 is changed, the duty upper limit value becomes the same as the actual duty value, the high-voltage-side voltage cannot be raised from the present value. In order to avoid this problem, it is required to secure the operable range of the duty value; therefore, as represented in the right-hand side of the equation (8), the duty upper limit value is calculated through the equation in which the duty offset $\alpha_1$ is added.

In this situation, it is assumed that $\beta_1$, $\beta_2$, and $\alpha_2$ are a low-voltage-side correction coefficient at a time when the effect of the detection error rate of the low-voltage-side voltage sensor 203 is considered, a high-voltage-side correction coefficient at a time when the effect of the detection error rate of the high-voltage-side voltage sensor 201 is considered, and a correction coefficient at a time when there are considered the effect of a dead time where the first switching device 103 and the second switching device 104, which are the lower arm and the upper arm, respectively, of the electric-power conversion unit 110, are turned off at the same time and the effect of a voltage drop due to the resistance components of the circuit and the constituent parts thereof, respectively. The duty upper limit value DutyMax (V1s, V2s) at a time when these correction coefficients are considered can be given by the equation (9) below; the value given by the equation (9) can be adopted as the duty upper limit value.

$$DutyMax(V1s, V2s) = 1 - \frac{V1s \times \beta_1}{V2s \times \beta_2} + \alpha_1 + \alpha_2 \quad (9)$$

Here, the methods of setting the correction coefficients will be described. The low-voltage-side correction coefficient $\beta 1$ is set to the minimum value of the error rate of the low-voltage-side voltage sensor 203; the high-voltage-side correction coefficient $\beta 2$ is set to the possible maximum value of the error rate of the high-voltage-side voltage sensor 201. The correction coefficient $\alpha 2$ is set to a value for correcting the possible maximum value of the dead time and the duty error due to the voltage drops caused by the resistance values of the circuit and the constituent components thereof.

The low-voltage-side correction coefficient $\beta 1$ and the high-voltage-side correction coefficient $\beta 2$ are defined by the equations (10) and (11) below, respectively.

$$V1s = \beta_1 \times V1 \quad (10)$$

$$V2s = \beta_2 \times V2 \quad (11)$$

With regard to the calculation of the duty upper limit values, any one of or both of the high-voltage-side voltage target value V2ref and the low-voltage-side voltage fixation value V1c may be replaced based on the equation (9), as represented by the equations (12), (13), and (14).

$$DutyMax(V1s, V2ref) = 1 - \frac{V1s \times \beta_1}{V2ref} + \alpha_1 + \alpha_2 \qquad (12)$$

$$DutyMax(V1c, V2s) = 1 - \frac{V1c}{V2s \times \beta_2} + \alpha_1 + \alpha_2 \qquad (13)$$

$$DutyMax(V1c, V2ref) = 1 - \frac{V1c}{V2ref} + \alpha_1 + \alpha_2 \qquad (14)$$

The lowpass filter block 316 in FIG. 3 applies lowpass filter calculation to the calculation result Y obtained by the limited duty value calculation block 317; therefore, erroneous operation in which noise or the like suddenly change the duty upper limit value can be prevented, and hence an excessive current at a time when a short-to-ground failure occurs in the high-voltage-side voltage sensor 201 can be prevented.

Embodiment 2

Figure 8:
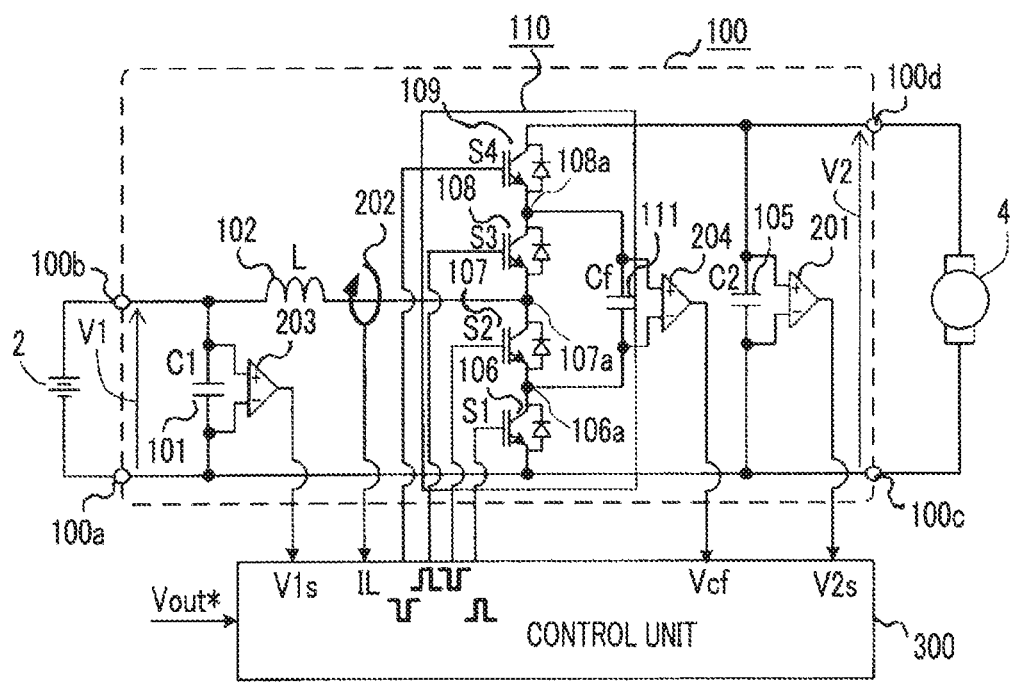
FIG. 8 is a circuit diagram representing the circuit configuration of a DC power source apparatus according to Embodiment 2 of the present invention.
Figure 9:
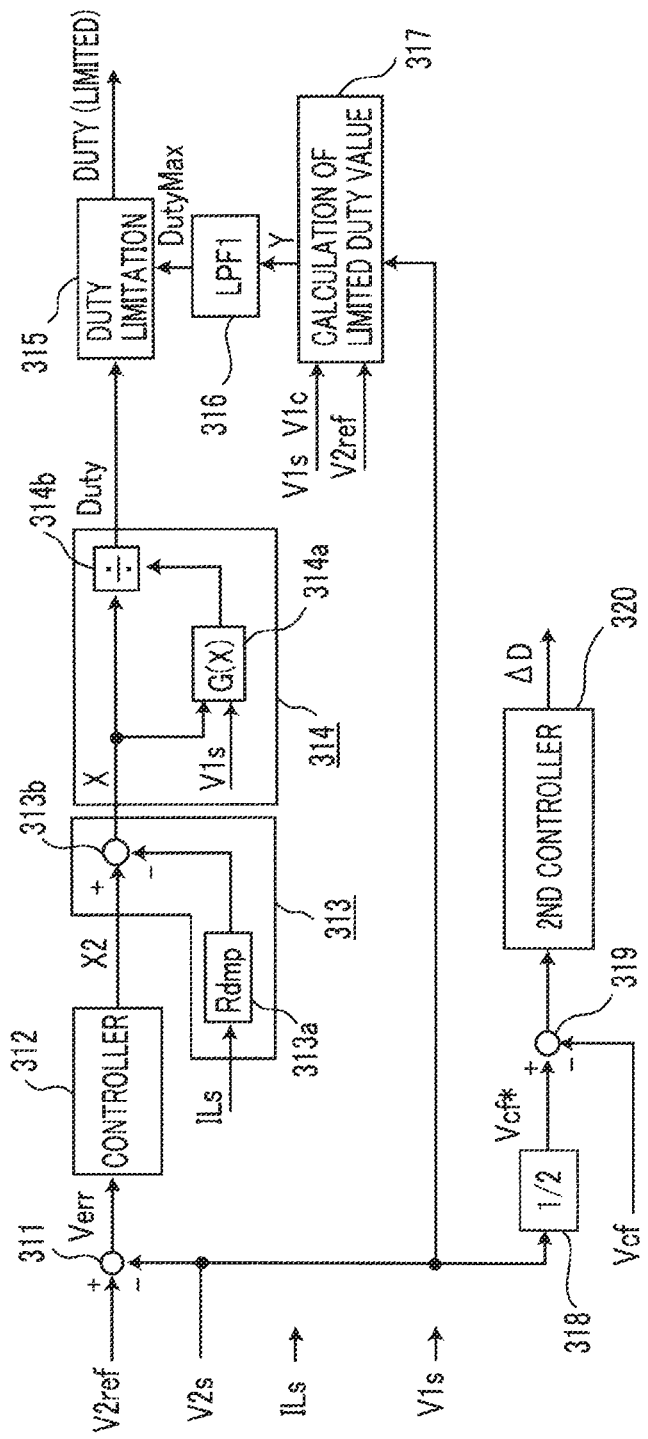
FIG. 9 is a functional block diagram representing the function of voltage feedback control in the DC power source apparatus according to Embodiment 2 of the present invention.

Next, a DC power source apparatus according to Embodiment 2 of the present invention will be explained. FIG. 8 is a circuit diagram representing the circuit configuration of the DC power source apparatus according to Embodiment 2 of the present invention; FIG. 9 is a functional block diagram representing the function of voltage feedback control in the DC power source apparatus according to Embodiment 2 of the present invention. In FIG. 8, a DC/DC converter 100, as a DC power source apparatus, is a DC/DC converter, as a bidirectional electric power converter, that can perform bidirectional electric-power conversion between a low-voltage-side power source 2 such as a battery and a high-voltage-side load 4 such as a DC motor. The DC/DC converter 100 boosts a voltage V1 inputted from the power source 2 up to a voltage V2 that is the same as or higher than the voltage V1, and then outputs the V2.

The DC/DC converter 100 includes an electric-power conversion unit 110. The electric-power conversion unit 110 includes a first switching device 106 (also referred to as S1), a second switching device 107 (also referred to as S2), a third switching device 108 (also referred to as S3), a fourth switching device 109 (also referred to as S4), and a charging/discharging capacitor 111.

In the electric-power conversion unit 110, the collector terminal of the first switching device 106 and the emitter terminal of the second switching device 107 are connected with each other at a first connection portion 106a. The collector terminal of the second switching device 107 and the emitter terminal of the third switching device 108 are connected with each other at a second connection portion 107a. The collector terminal of the third switching device 108 and the emitter terminal of the fourth switching device 109 are connected with each other at a third connection portion 108a.

One of the terminals of the charging/discharging capacitor 111 is connected with the first connection portion 106a, which is the connection portion between the collector terminal of the first switching device 106 and the emitter terminal of the second switching device 107; the other end thereof is connected with the third connection portion 108a, which is the connection portion between the collector terminal of the third switching device 108 and the emitter terminal of the fourth switching device 109.

In other words, the electric-power conversion unit 110 is formed of a switching device series circuit in which the first switching device 106, the second switching device 107, the third switching device 108, and the fourth switching device 109 are connected in series; the emitter terminal of the first switching device 106 is connected with a third terminal 100c; the collector terminal of the fourth switching device 109 is connected with a fourth terminal 100d.

A first terminal 100a and the third terminal 100C are connected in common with each other. Each one of the first terminal 100a and the third terminal 100c may serve as the other one thereof.

As the first switching device 106, the second switching device 107, the third switching device 108, and the fourth switching device 109, for example, IGBTs (Insulated Gate Bipolar Transistors) are utilized; In Embodiment 2, each of the IGBTs is turned on when the gate signal is high-level and is turned off when the gate signal is low-level.

The voltage V1 inputted to the DC/DC converter 100 is boosted to the voltage V2 that is the same as or higher than the voltage V1 and is outputted from the DC/DC converter 100; therefore, in the following explanation, the voltage V1 and the voltage V2 will be referred to as a low-voltage-side voltage V1 and a high-voltage-side voltage V2, respectively.

The power source 2, the negative-polarity electrode of which is connected with the first terminal 100a (also referred to as Vcom) of the DC/DC converter 100 and the positive-polarity electrode of which is connected with a second terminal 100b (also referred to as VL) thereof, inputs the low-voltage-si de voltage V1 to the DC/DC converter 100. The load 4 is connected between a third terminal 100c and a fourth terminal 100d of the DC/DC converter 100; the high-voltage-side voltage V2 outputted from the DC/DC converter 100 is applied to the load 4.

A reactor 102, provided for accumulating energy, is connected between the second connection portion 107a of the electric-power conversion unit 110 and the second terminal 100b. A low-voltage-side smoothing capacitor 101, connected between the first terminal 100a and the second terminal 100b, smoothes the low-voltage-side voltage-side voltage V1. A high-voltage-side smoothing capacitor 105, connected between the third terminal 100c and the fourth terminal 100d, smoothes the high-voltage-side voltage V2, which is the output of the electric-power conversion unit 110.

A low-voltage-side voltage sensor 203, connected between the first terminal 100a and the second terminal 100b, constantly detects the voltage between the first terminal 100a and the second terminal 100b, i.e., the low-voltage-side voltage V1, and inputs a low-voltage-side voltage detection value V1s to a control unit 300. A high-voltage-side voltage sensor 201, connected between the third terminal 100c and the fourth terminal 100d, constantly detects the voltage across the terminals of the high-voltage-side smoothing capacitor 105, i.e., the high-voltage-side voltage V2 that is a voltage between the voltage between the third terminal 100c and the fourth terminal 100d and is obtained through voltage boosting by the electric-power conversion unit 110, and inputs a high-voltage-side voltage detection value V2s to the control unit 300.

A charging/discharging capacitor voltage sensor 204 constantly detects a charging/discharging capacitor voltage, which is the voltage across the charging/discharging capacitor 111 included in the electric-power conversion unit 110, and inputs a charging/discharging capacitor voltage detection value Vcf to the control unit 300. A current sensor 202 constantly detects a reactor current IL that flows in the reactor 102, and inputs a current detection value ILs to the control unit 300.

As described later, based on a high-voltage-side voltage target value V2ref to be inputted from the outside, the low-voltage-side voltage detection value V1s, the high-voltage-side voltage detection value V2s, the charging/discharging capacitor voltage detection value Vcf, and the current detection value ILs, the control unit 300 generates a first gate signal, a second gate signal, a third gate signal, and a fourth gate signal, and provides the first gate signal, the second gate signal, the third gate signal, and the fourth gate signal to the gates of the first switching device 106, the second switching device 107, the third switching device 108, and the fourth switching device 109, respectively. The control unit 300 has a function of performing voltage feedback control based on information on the low-voltage-side voltage detection value V1s and the high-voltage-side voltage detection value V2s.

Figure 10:
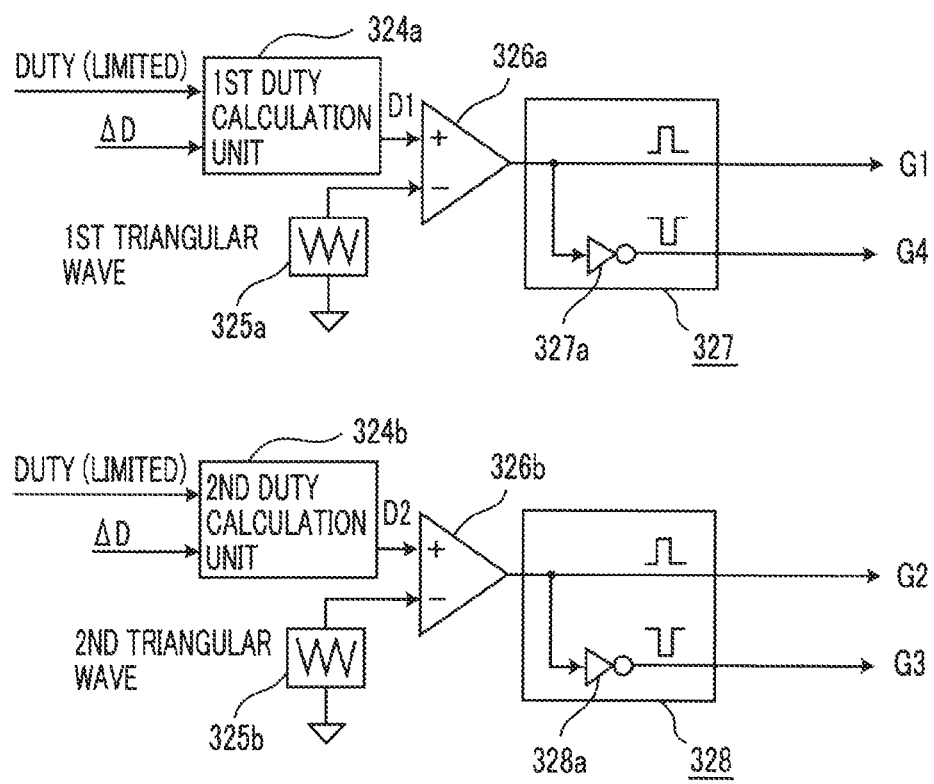
FIG. 10 is a functional block diagram representing the function of generating a PWM waveform in the DC power source apparatus according to Embodiment 2 of the present invention.

FIG. 9 is a functional block diagram representing the function of voltage feedback control in the DC power source apparatus according to Embodiment 2 of the present invention; FIG. 10 is a functional block diagram representing the function of generating a PWM waveform in the DC power source apparatus according to Embodiment 2 of the present invention; FIG. 10 represents the functional configuration of the control unit 300 in FIG. 8, described above. As represented in FIG. 9, the control unit 300 includes, as the functional configuration thereof, a subtractor 311, a first controller 312, a resonance suppression block 313, a gain normalization block 314, a duty limiting block 315, a lowpass filter block 316, and a limited duty value calculation block 317. Although configured in the same manner as the controller 312 in Embodiment 1, the first controller 312 is referred to as the first controller. The resonance suppression block 313 includes a multiplier 313a and a subtractor 313b. The gain normalization block 314 includes a computing unit 314a and a divider 314b. The operation performed before the duty limiting block 315 outputs a limited duty value Duty is the same as that in Embodiment 1, described above.

In Embodiment 2, a charging/discharging capacitor voltage target value generator 318 is configured in such a way as to create and output a value that is half of (0.5 times as large as) the high-voltage-side voltage target value V2ref, as the charging/discharging capacitor voltage target value Vcf*, in order to minimize the ripple in the reactor current. A subtractor 319 performs a subtraction between the charging/discharging capacitor voltage target value Vcf* from the charging/discharging capacitor voltage target value generator 318 and the charging/discharging capacitor voltage detection value Vcf from the charging/discharging capacitor voltage sensor 204, and outputs a differential voltage ΔVcf, which is the difference between the charging/discharging capacitor voltage target value Vcf* and the charging/discharging capacitor voltage detection value Vcf. The second controller 320 amplifies the differential voltage ΔVcf from the subtractor 310 and outputs a difference voltage amplification value ΔD.

In the functional block diagram, in FIG. 10, representing the function of generating the PWM waveform, a first duty calculation unit 324a outputs a first duty value D1, based on the limited duty value Duty from the duty limiting block 315 and the difference voltage amplification value ΔD from the second controller 320. A first triangular-wave generation unit 325a outputs a first triangular waveform having a specific period. A first comparator 326a generates a first gate signal G1, as a first pulse waveform, based on the comparison between the first duty value D1 from the first duty calculation unit 324a and the first triangular waveform from the first triangular-wave generation unit 325a. The first gate signal G1 is provided to the first switching device 106 so as to drive the first switching device 106. The first triangular-wave generation unit 325a may be replaced by a sawtooth waveform generation unit that generates not a triangular waveform but a sawtooth waveform.

The first gate signal G1 outputted from the first comparator 326a is inverted by a first inverter 327a to become a fourth gate signal G4 and is provided to the gate of the fourth switching device 109 so as to drive the fourth switching device 109. The high level and the low level of the fourth gate signal G4 are complementary to the low level and the high level of the first gate signal G1.

A second duty calculation unit 324b outputs a second duty value D2, based on the limited duty value Duty from the duty limiting block 315 and the difference voltage amplification value ΔD from the second controller 320. A second triangular-wave generation unit 325b outputs a second triangular waveform having a specific period. A second comparator 326b generates a second gate signal G2, as a second pulse waveform, based on the comparison between the second duty value D2 from the second duty calculation unit 324b and the second triangular waveform from the second triangular-wave generation unit 325b. The second gate signal 2 is provided to the second switching device 107 so as to drive the second switching device 107. The second triangular-wave generation unit 325b may be replaced by a sawtooth waveform generation unit that generates not a triangular waveform but a sawtooth waveform.

The second gate signal G2 outputted from the second comparator 326b is inverted by a second inverter 328a to become a third gate signal G3 and is provided to the gate of the third switching device 108 so as to drive the third switching device 108. The high level and the low level of the third gate signal G3 are complementary to the low level and the high level of the second gate signal G2.

Next, the steady-state operation of the DC/DC converter 100, as the DC power source apparatus, configured in such a manner as described above, according to Embodiment 2 of the present invention will be explained. Here, the steady state denotes the state where the first switching device 106, the second switching device 107, the third switching device 108, and the fourth switching device 109 are on/off-controlled so that the high-voltage-side voltage detection value V2s can stably be obtained. As is the case with Embodiment 1, described above, as the operation states of the DC/DC converter 100, there exist two states, i.e., a power-running operation state in which electric power is supplied from a battery as the power source 2 to a motor as the load 4 so that the motor is driven and a regenerative operation state in which electric power generated by the motor in a power generation state is supplied to the battery.

Figure 11:
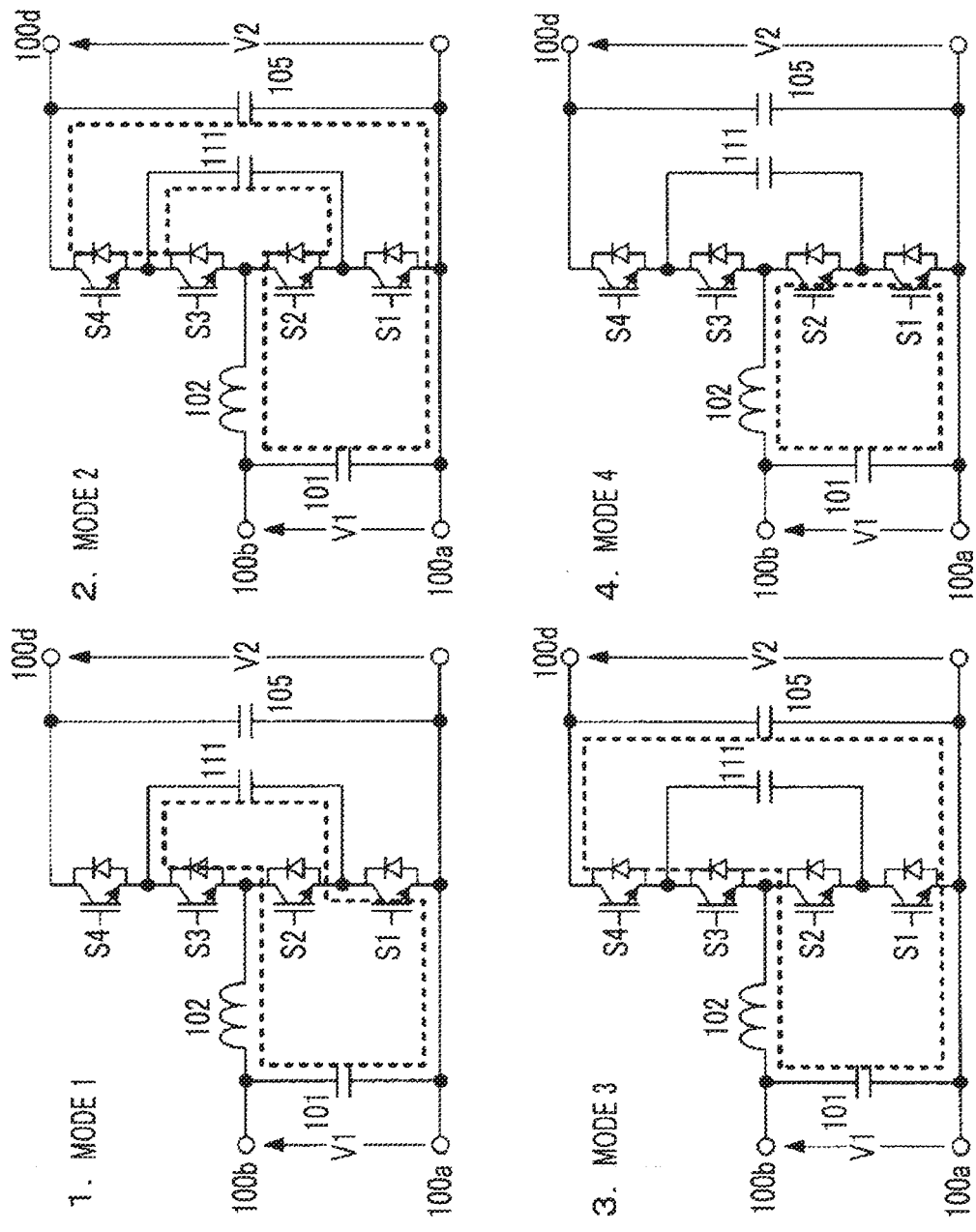
FIG. 11 is a set of explanatory diagrams representing the operation modes of the DC power source apparatus according to Embodiment 2 of the present invention.

FIG. 11 is a set of explanatory diagrams representing the operation modes of the DC power source apparatus according to Embodiment 2 of the present invention; Diagrams 1, 2, 3, and 4 represent the operation states of modes 1, 2, 3, and 4, respectively. In FIG. 11, the first switching device, the second switching device, the third switching device, and the fourth switching device are expressed by S1, S2, S3, and S4, respectively; the following explanations will be made by use of the reference numerals S1, S2, S3, and S4.

The mode 1 represented in Diagram 1 of FIG. 11 is an operation mode where the first switching device S1 and the third switching device S3 are turned on at the same time and the second switching device S2 and the fourth switching device S4 are turned off at the same time. In the mode 1, as represented by a broken line, in the case of the power running state, energy is accumulated in the charging/discharging capacitor 111 through a closed circuit circulating through the low-voltage-side smoothing capacitor 101, the reactor 102, a diode that is connected in parallel with the third switching device S3, the charging/discharging capacitor 111, the first switching device S1, and the low-voltage-side smoothing capacitor 101, in that order. In the case of the regenerative state, energy in the charging/discharging capacitor 111 is discharged through a closed circuit circulating through the charging/discharging capacitor 111, the third switching device S3, the reactor 102, the low-voltage-side smoothing capacitor 101, a diode that is connected in parallel with the first switching device S1, and the charging/discharging capacitor 111, in that order.

The mode 2 represented in Diagram 2 of FIG. 11 is an operation mode where the first switching device S1 and the third switching device S3 are turned off at the same time and the second switching device S2 and the fourth switching device S4 are turned on at the same time. In the mode 2, as represented by a broken line, in the case of the power running state, energy in the charging/discharging capacitor 111 is discharged through a closed circuit circulating through the charging/discharging capacitor 111, a diode that is connected in parallel with the fourth switching device S4, the high-voltage-side smoothing capacitor 105, the low-voltage-side smoothing capacitor 101, the reactor 102, the second switching device S2, and the charging/discharging capacitor 111, in that order. In the case of the regenerative state, energy is accumulated in the charging/discharging capacitor 111 through a closed circuit circulating through the high-voltage-side smoothing capacitor 105, the fourth switching device S4, the charging/discharging capacitor 111, a diode that is connected in parallel with the second switching device S2, the low-voltage-side smoothing capacitor 101, the diode that is connected in parallel with the first switching device S1, the charging/discharging capacitor 111, in that order.

The mode 3 represented in Diagram 3 of FIG. 11 is an operation mode where the first switching device S1 and the second switching device S2 are turned off at the same time and the third switching device S3 and the fourth switching device S4 are turned on at the same time. In the mode 3, as represented by a broken line, in the case of the power running state, energy in the reactor 102 is discharged through a closed circuit circulating through the reactor 102, the diode that is connected in parallel with the third switching device S3, the diode that is connected in parallel with the fourth switching device S4, the high-voltage-side smoothing capacitor 105, the low-voltage-side smoothing capacitor 101, the reactor 102, in that order. In the case of the regenerative state, energy is accumulated in the reactor 102 through a closed circuit circulating through the high-voltage-side smoothing capacitor 105, the fourth switching device S4, the third switching device S3, the reactor 102, the low-voltage-side smoothing capacitor 101, and the high-voltage-side smoothing capacitor 105, in that order.

The mode 4 represented in Diagram 4 of FIG. 11 is an operation mode where the first switching device S1 and the second switching device S2 are turned on at the same time and the third switching device S3 and the fourth switching device S4 are turned off at the same time. In the mode 4, as represented by a broken line, in the case of the power running state, energy is accumulated in the reactor 102 through a closed circuit circulating through the low-voltage-side smoothing capacitor 101, the reactor 102, the second switching device S2, the first switching device S1, and the low-voltage-side smoothing capacitor 101, in that order. In the case of the regenerative state, energy in the reactor 102 is discharged through a closed circuit circulating through the reactor 102, the low-voltage-side smoothing capacitor 101, the diode that is connected in parallel with the first switching device S1, the diode that is connected in parallel with the second switching device S2, and the reactor 102, in that order.

The time proportions of the modes 1, 2, 3, and 4 are appropriately adjusted, so that it is made possible to boost the low-voltage-side voltage V1, which is an input voltage inputted between the first terminal 100a and the second terminal 100b, up to an arbitrary voltage and to output the boosted voltage, as the high-voltage-side voltage V2, between the third terminal 100c and the fourth terminal 100d.

Next, the operation of the control unit 300 of the DC/DC converter 10, as the DC power source apparatus according to Embodiment 2, will be explained. Letting D1 and D2 denote a duty value that is the ratio of the on-time to the switching period of the first switching device S1 and a duty value that is the ratio of the on-time to the switching period of the second switching device S2, the duty value that is the ratio of the on-time to the switching period of the third switching device S3 is (1−D2), and the duty value that is the ratio of the on-time to the switching period of the fourth switching device S4 is (1−D1).

Letting C1, C2, Cf, L, IL, and $I_2$ denote the electrostatic capacitance of the low-voltage-side smoothing capacitor 101, the electrostatic capacitance of the high-voltage-side smoothing capacitor 105, the electrostatic capacitance of the charging/discharging capacitor 111, the inductance value of the reactor 102 for accumulating energy, the current that flows in the reactor 102, and the output current of the DC/DC converter 100, the state average equation for the DC/DC converter 100 can be expressed by the equation (15) below.

$$\frac{d}{dt}\begin{bmatrix} I_L \\ V_2 \\ V_{cf} \end{bmatrix} = \begin{bmatrix} 0 & -\frac{1-D_1}{L} & \frac{D_2-D_1}{L} \\ \frac{1-D_1}{C_2} & 0 & 0 \\ \frac{D_1-D_2}{C_f} & 0 & 0 \end{bmatrix} \begin{bmatrix} I_L \\ V_2 \\ V_{cf} \end{bmatrix} + \begin{bmatrix} \frac{1}{L} \\ 0 \\ 0 \end{bmatrix} V_1 + \begin{bmatrix} 0 \\ -\frac{1}{C_2} \\ 0 \end{bmatrix} I_2 \quad (15)$$

In the steady state, by substituting "0" for the left-hand side of the equation (15), the equations (16), (17), and (18) below are obtained; it can be seen that in the steady state, each of the high-voltage-side voltage V2 and the charging/discharging capacitor voltage detection value Vcf converges on a fixed value, in ideal cases, by making the duty values D1 and D1 equal to each other.

$$\frac{V2}{V_1} = \frac{1}{1-D_1} \quad (16)$$

$$IL = \frac{I_2}{1-D_1} \quad (17)$$

$$D_1 = D_2 \quad (18)$$

Because the equation (16) representing the relationship among the duty value, the low-voltage-side voltage V1, and the high-voltage-side voltage V2, the calculation of the limited duty value for limiting the high-voltage-side voltage V2, and the configuration of the lowpass filter block 316 are the same as those in Embodiment 1, described above; therefore, in Embodiment 2, the same effect as that in Embodiment 1 can be obtained.

It may be allowed that in each of Embodiments 1 and 2, there is provided switching devices that can perform control in such a way that the high-voltage-side voltage becomes substantially the same as or higher than the low-voltage-side voltage. Moreover, it may be allowed that in each of embodiments 1 and 2, the voltage of the power source changes when the switching device operates.

Various modifications and alterations of this invention will be apparent to those skilled in the art without departing from the scope and spirit of this invention, and it should be understood that this is not limited to the illustrative embodiments set forth herein.

What is claimed is:

1. A DC power source apparatus that is connected between a power source and a load and that boosts the voltage of the power source and then supplies the boosted voltage to the load, the DC power source apparatus comprising:
   a reactor connected between an interconnection portion of a plurality of switching devices and the power source;
   a low-voltage-side smoothing capacitor that smooths a low-voltage-side voltage to be applied to the reactor;
   a high-voltage-side smoothing capacitor that smooths a high-voltage-side voltage to be supplied to the load;
   a low-voltage-side voltage sensor that detects the low-voltage-side voltage;
   a high-voltage-side voltage sensor that detects the high-voltage-side voltage; and
   a control unit that performs PWM-control of the plurality of switching devices in such a way that a high-voltage-side voltage detection value V2s detected by the high-voltage-side voltage sensor keeps track of a high-voltage-side voltage target value,
   wherein the control unit includes a function of limiting a duty value that is the ratio of an on-time to a switching period of the switching device, and makes an upper limit value for limiting the upper limit of the duty value variable during switching operation of the switching device,
   wherein the upper limit value of the duty value is determined based on at least the high-voltage-side voltage detection value detected by the high-voltage-side voltage sensor and a low-voltage-side voltage detection value V1s detected by the low-voltage-side voltage sensor,
   wherein letting $\beta_1$ denote a low-voltage-side correction coefficient at a time when the effect of the detection error rate of the low-voltage-side voltage sensor is considered, letting $\beta_2$ denote a high-voltage-side correction coefficient at a time when the effect of the detection error rate of the high-voltage-side voltage sensor is considered, letting $\alpha_1$ denote a duty offset for securing the operable range of the duty value, letting $\alpha_2$ denote a correction coefficient at a time when there are considered the effect of a dead time where the plurality of switching devices are turned off at the same time and the effect of a voltage drop due to the resistance components of circuit constituent parts, and letting DutyMax(V1s, V2s) denote the upper limit value of the duty value, respectively, the upper limit value of the duty value is calculated by the following equation $$DutyMax(V1s, V2s) = 1 - \frac{V1s \times \beta_1}{V2s \times \beta_2} + \alpha_1 + \alpha_2.$$

2. The DC power source apparatus according to claim 1, wherein the upper limit value of the duty value is a value obtained after the duty value passed through a lowpass filter.

3. The DC power source apparatus according to claim 1, wherein the plurality of switching devices include a first switching device and a second switching device,
   wherein the first switching device and the second switching device form a switching unit, and
   wherein switching operation of the switching devices in the switching unit accumulates energy in and discharges energy from the reactor.

4. The DC power source apparatus according to claim 1, further including a capacitor for transferring energy,
   wherein the plurality of switching devices include the first switching device, the second switching device, and a third switching device, and a fourth switching device,
   wherein the first switching device and the second switching device form a first switching unit,
   wherein the third switching device and the fourth switching device form a second switching unit,
   wherein the first switching device and the second switching device are connected in series with each other, and
   wherein switching operation of the switching devices in the first switching unit and the second switching unit charges and discharges the capacitor for transferring energy and also accumulates energy in and discharges energy from the reactor.

5. The DC power source apparatus according to claim 1, wherein there is provided switching devices that can perform control in such a way that the high-voltage-side voltage becomes substantially the same as or higher than the low-voltage-side voltage.

6. The DC power source apparatus according to claim 1, wherein the voltage of the power source changes when the switching device operates.

7. The DC power source apparatus according to claim 6, wherein the power source is formed of a battery.

8. A DC power source apparatus that is connected between a power source and a load and that boosts the voltage of the power source and then supplies the boosted voltage to the load, the DC power source apparatus comprising:
   a reactor connected between an interconnection portion of a plurality of switching devices and the power source;
   a low-voltage-side smoothing capacitor that smooths a low-voltage-side voltage to be applied to the reactor;
   a high-voltage-side smoothing capacitor that smooths a high-voltage-side voltage to be supplied to the load;
   a low-voltage-side voltage sensor that detects the low-voltage-side voltage;
   a high-voltage-side voltage sensor that detects the high-voltage-side voltage; and
   a control unit that performs PWM-control of the plurality of switching devices in such a way that a high-voltage-side voltage detection value V2s detected by the high-voltage-side voltage sensor keeps track of a high-voltage-side voltage target value,
   wherein the control unit includes a function of limiting a duty value that is the ratio of an on-time to a switching period of the switching device, and makes an upper limit value for limiting the upper limit of the duty value variable during switching operation of the switching device, wherein the upper limit value of the duty value is determined based on at least the high-voltage-side voltage detection value V2s detected by the high-voltage-side voltage sensor and a low-voltage-side voltage fixation value V1c that is a fixed value of the low-voltage-side voltage, wherein letting $\beta_1$ denote a low-voltage-side correction coefficient at a time when the effect of the detection error rate of the low-voltage-side voltage sensor is considered, letting $\beta_2$ denote a high-voltage-side correction coefficient at a time when the effect of the detection error rate of the high-voltage-side voltage sensor is considered, letting $\alpha_1$ denote a duty offset for securing the operable range of the duty value, letting $\alpha_2$ denote a correction coefficient at a time when there are considered the effect of a dead time where the plurality of switching devices are turned off at the same time and the effect of a voltage drop due to the resistance components of circuit constituent parts, and letting DutyMax(V1c, V2s) denote the upper limit value of the duty value, respectively, the upper limit value of the duty value is calculated by the following equation $$DutyMax(V1c, V2s) = 1 - \frac{V1c}{V2s \times \beta_2} + \alpha_1 + \alpha_2.$$

9. A DC power source apparatus that is connected between a power source and a load and that boosts the voltage of the power source and then supplies the boosted voltage to the load, the DC power source apparatus comprising:
  a reactor connected between an interconnection portion of a plurality of switching devices and the power source;
  a low-voltage-side smoothing capacitor that smooths a low-voltage-side voltage to be applied to the reactor;
  a high-voltage-side smoothing capacitor that smooths a high-voltage-side voltage to be supplied to the load;
  a low-voltage-side voltage sensor that detects the low-voltage-side voltage;
  a high-voltage-side voltage sensor that detects the high-voltage-side voltage; and
  a control unit that performs PWM-control of the plurality of switching devices in such a way that a high-voltage-side voltage detection value detected by the high-voltage-side voltage sensor keeps track of a high-voltage-side voltage target value, wherein the upper limit value of the duty value is determined based on at least the high-voltage-side voltage target value that is a target value of the high-voltage-side voltage and a low-voltage-side voltage fixation value that is a fixed value of the low-voltage-side voltage, wherein the upper limit value of the duty value is determined based on at least the high-voltage-side voltage target value that is a target value of the high-voltage-side voltage and a low-voltage-side voltage fixation value V1c that is a fixed value of the low-voltage-side voltage, and wherein letting $\alpha_1$ denote a duty offset for securing the operable range of the duty value, letting $\alpha_2$a denote correction coefficient at a time when there are considered the effect of a dead time where the plurality of switching devices are turned off at the same time and the effect of a voltage drop due to the resistance components of circuit constituent parts, letting V2ref denote the high-voltage-side voltage target value, letting V1c denote the low-voltage-side voltage fixation value, and letting DutyMax(V1c, V2ref) denote the upper limit value of the duty value, respectively, the upper limit value of the duty value is calculated by the following equation $$DutyMax(V1c, V2ref) = 1 - \frac{V1c}{V2ref} + \alpha_1 + \alpha_2.$$

* * * * *